United States Patent [19]
Gotwald

[11] Patent Number: 5,987,518
[45] Date of Patent: Nov. 16, 1999

[54] METHOD AND APPARATUS FOR COMMUNICATING INTERNET PROTOCOL DATA OVER A BROADBAND MPEG CHANNEL

[75] Inventor: Frederick L. Gotwald, San Diego, Calif.

[73] Assignee: General Instrument Corporation, Horsham, Pa.

[21] Appl. No.: 08/738,878

[22] Filed: Oct. 28, 1996

[51] Int. Cl.⁶ .................................................. G06F 13/00
[52] U.S. Cl. .................................. 709/230; 348/7; 348/17
[58] Field of Search .................. 395/200.76, 200.61; 370/58.1, 85.3, 60, 94.1, 942, 436; 348/441, 17, 7; 380/2; 709/200, 213

[56] References Cited

U.S. PATENT DOCUMENTS

| | | | |
|---|---|---|---|
| 5,214,694 | 5/1993 | Furuya et al. ................................ | 380/2 |
| 5,347,304 | 9/1994 | Moura et al. . | |
| 5,440,547 | 8/1995 | Easki et al. ................................ | 370/60 |
| 5,446,735 | 8/1995 | Tobagi et al. ........................... | 370/85.3 |
| 5,481,542 | 1/1996 | Logston et al. ......................... | 370/94.2 |
| 5,544,161 | 8/1996 | Bigham et al. ......................... | 370/58.1 |
| 5,666,487 | 9/1997 | Goodman et al. ................ | 395/200.76 |
| 5,668,948 | 9/1997 | Belknap et al. .................... | 395/200.61 |
| 5,673,252 | 5/1995 | Johnson et al. ......................... | 370/94.1 |
| 5,675,732 | 10/1997 | Majeti et al. ............................ | 709/200 |
| 5,696,765 | 12/1997 | Sfadi ........................................ | 370/436 |
| 5,737,024 | 4/1998 | Chikira .................................... | 348/441 |
| 5,761,416 | 6/1998 | Mandal et al. ........................... | 709/213 |
| 5,828,403 | 10/1998 | DeRodeff et al. .......................... | 348/7 |
| 5,844,600 | 12/1998 | Kerr ........................................... | 348/17 |

OTHER PUBLICATIONS

Valencia. Achitecture for Broadband Residential IP Services Over CATV Networks. IEEE Jan. 1997.
Li et al. TCP/IP Performance & Behavior Over AN ATM Network. IEEE May 1996.

(List continued on next page.)

*Primary Examiner*—Frank J. Asta
*Assistant Examiner*—Thong Vu
*Attorney, Agent, or Firm*—Barry R. Lipsitz; Ralph F. Hoppin

[57] ABSTRACT

Computer data provided according to a first data protocol, such as the Internet protocol, is communicated over a digital television broadcast network using a second data protocol such as MPEG2. The computer data in the first data protocol is encapsulated in at least one data stream for distribution in conformance with the second data protocol. The at least one data stream encapsulating the computer data is multiplexed with a plurality of data streams conforming to the second data protocol for transmission over the network, which may be a cable or satellite television network. The data stream encapsulating the computer data is received from the network according to the second data protocol, and processed in accordance with the second data protocol to recover the computer data in the first data protocol. A prioritization scheme is provided wherein different messages in the first data protocol are prioritized in the output multiplex according to at least one of source address, destination address, data type and connection type.

23 Claims, 4 Drawing Sheets

OTHER PUBLICATIONS

Arcidiacono, A., "Multimedia Services and Data Broadcasting Via Satellite," *International Broadcasting Convention*, IEE Conference Publication No. 428, Sep. 1996, pp. 127–128.

Bohn, R. et al., "Mitigating the Coming Internet Crunch: Multiple Service Levels Via Precedence," *Journal of High Speed Networks*, vol. 3, No. 4, 1994, pp. 335–349.

Arcidiacono, A., "Multimedia Services and Data Broadcasting Via Satellite," *Electronics and Communication Engineering Journal*, vol. 9, No. 1, Feb. 1997, pp. 33–37.

"Time Warner–Motorola Union Still Intact", *Interactive Week*, vol. 3, No. 17, Aug. 26–Sep. 2, 1996, pp. I–10.

International Organization for Standardization, ISO/IEC 13818–6, *Coding of Moving Pictures and Associated Audio*, "Digital Storage Media Command & Control", Jul. 12, 1996 (pre–editing release), Chapter 9 (Transport).

ATM, Theory & Application, D. McDysan & D. Spohn 1994.

Video Over ATM& Existing Networks [http://web.mis.ccu, edu.tw/videoatm] Dec. 1995.

Designing Internetworks for Multimedia, Cisco System Inc Apr. 9, 1996.

RFC 1112, Host Extensions for IP Multicasting. Steve Deering Aug. 1989.

METHOD AND APPARATUS FOR COMMUNICATING INTERNET PROTOCOL DATA OVER A BROADBAND MPEG CHANNEL

BACKGROUND OF THE INVENTION

The present invention relates to communication systems, and more particularly to a method and apparatus for communicating computer data provided according to a first data protocol (e.g., the Internet protocol) over a digital television broadcast network which uses a second data protocol (e.g., MPEG2) to carry a plurality of data streams.

Communication systems may be described as being unidirectional or bidirectional in nature. Unidirectional systems include broadcast services such as radio and television. Bidirectional systems include telephone and computer networks.

It is expected that broadcast services, which currently use analog distribution schemes, will be transitioned to digital communication schemes. Presently, the most common way to encapsulate information for communication over a digital broadcast service is to use standards developed by the Moving Picture Experts Group (MPEG), and particularly the MPEG2 standard described in the International Standards Organization ISO/IEC 13818 standard.

The digitization of broadcast services will provide many benefits. Among these are digital television and, ultimately, high definition television (HDTV). The availability of digital broadcast services can also provide for the communication of other types of information, such as Internet access. Presently, the most common way to encapsulate such computer information is to use the Internet protocol (IP). This protocol is entirely different from the MPEG2 protocol used, for example, in digital television broadcasting.

It would be advantageous to provide Internet access via a subscription television service, such as cable or satellite television. It would be further advantageous to provide Internet access to users who do not own personal computers. Such access could be provided, for example, via their television sets. To date, most access via the Internet has been made by conventional analog telephone modems and integrated service digital networks (ISDN) which operate at higher speeds than standard telephone lines, but at significantly higher cost. One alternative to using conventional analog telephone modems and ISDN services is to access Internet services with modems that can operate on cable or satellite television networks. Such networks have much greater bandwidth than is provided by telephone lines, and can therefore be advantageously used for high speed Internet communications. Currently, most cable television (CATV) networks (and all television satellite networks) are one-way broadcast networks. Such networks only provide communication from a headend to a user, and not in the reverse direction. Although the industry is upgrading to two-way ("bidirectional") CATV networks at a high rate, more than one-half of the one-way networks presently in existence are expected to remain into the foreseeable future.

Thus, it would be further advantageous to provide a cable or satellite modem that is low in cost, in order to enable cable and satellite television operators to provide low cost, high speed Internet access to their customers. It would be still further advantageous to provide low cost Internet access to the vast population of cable and satellite television subscribers.

The present invention provides methods and apparatus having the aforementioned and other advantages.

SUMMARY OF THE INVENTION

In accordance with the present invention, computer data provided according to a first data protocol is communicated over a digital television broadcast network which uses a second data protocol to carry a plurality of data streams. The computer data in the first data protocol is encapsulated in at least one of the data streams for distribution in conformance with the second data protocol. The at least one data stream encapsulating the computer data is multiplexed with the plurality of data streams conforming to the second data protocol for transmission over the network. At least one data stream is received from the network according to the second data protocol. The received at least one data stream is processed in accordance with the second data protocol to recover the computer data in the first data protocol.

In an illustrated embodiment, the first data protocol is an Internet protocol and the second data protocol is a MPEG protocol, such as MPEG2.

A plurality of different messages can be provided in the first data protocol. The different messages are prioritized according to at least one of source address, destination address, data type and connection type. The different messages are multiplexed with the plurality of data streams for transmission over the network according to priorities determined by the prioritizing step. The prioritizing step can be implemented to extract priority determining conditions from the messages. The priority for each message is determined in accordance with the extracted conditions. Each message is then tagged with its respective priority.

A method is provided for recovering computer data in an Internet protocol from a digital video data stream that carries a multiplex of different information signals using a digital video protocol. The multiplex is received from a digital video distribution channel. The multiplex is then processed using the digital video protocol to identify the computer data. The computer data is extracted from the multiplex and processed in accordance with the Internet protocol to recover information therefrom. The digital video protocol can be an MPEG protocol, such as MPEG2.

Apparatus is provided for communicating computer data in a first data protocol over a digital television broadcast network. The network uses a second data protocol to carry the plurality of data streams. Means are provided for assigning a priority to different computer data messages received in the first data protocol. A queue stores the computer data messages according to their assigned priority. A driver is provided for encapsulating the prioritized computer data messages received from the queue in the first data protocol in at least one of the data streams for distribution in conformance with the second data protocol. A multiplexer multiplexes the at least one data stream encapsulating the computer data with the plurality of data streams conforming to the second protocol for transmission over the network.

The means for prioritizing can be responsive to at least one of a source address, destination address, data type and connection type for each different message, in order to prioritize the message. In an illustrated embodiment, the means for prioritizing extract priority determining conditions from the messages. A priority is then determined for each message in accordance with the extracted conditions, and each message is tagged with its respective priority.

In the illustrated embodiment, the first data protocol is an Internet protocol and the second data protocol is an MPEG protocol, in particular, MPEG2.

Apparatus is also provided for recovering computer data in an Internet protocol from a digital video data stream carrying a multiplex of different information signals using a digital video protocol. A receiver receives the multiplex from a digital video distribution channel. Means are provided for processing the multiplex using the digital video protocol to identify the computer data. Means are also provided for extracting the computer data from the multiplex. The extracted computer data is then processed in accordance with the Internet protocol to recover information therefrom. The digital video protocol can comprise MPEG, and particularly MPEG2.

DETAILED DESCRIPTION OF THE INVENTION

Figure 1:
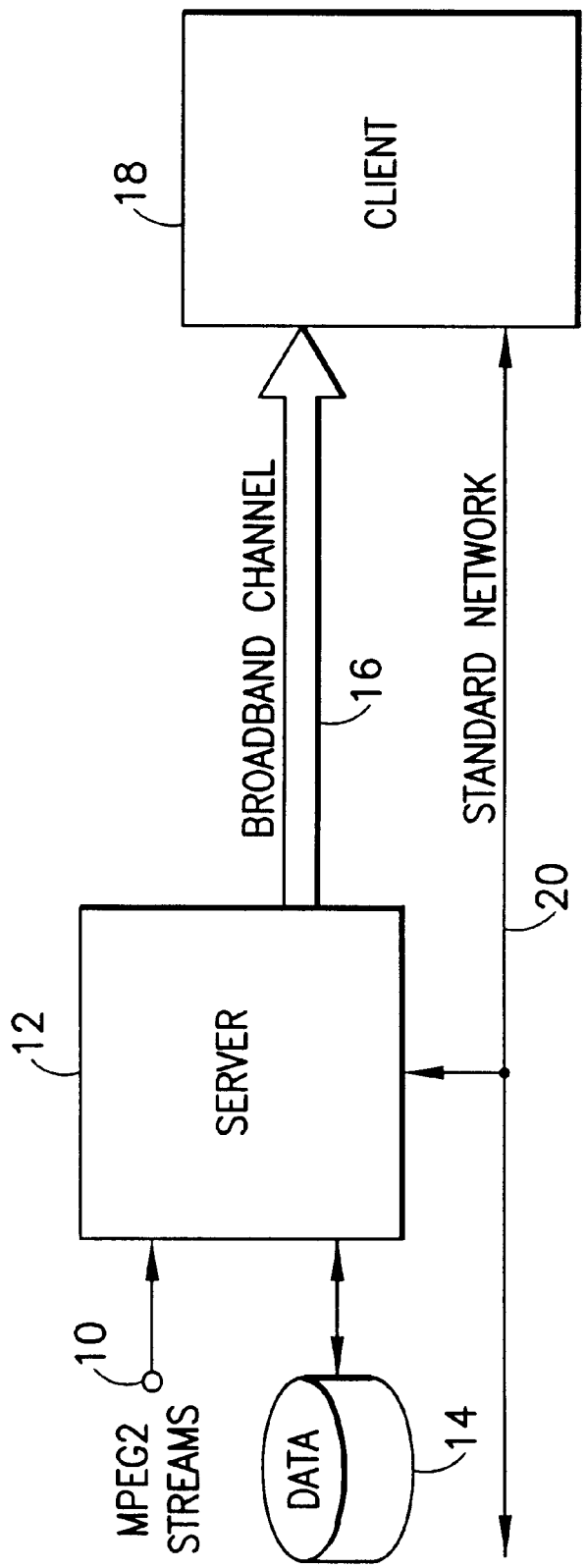
FIG. 1 is a block diagram illustrating a client/server architecture in which the present invention can be used.

FIG. 1 is block diagram of a client/server system carrying MPEG2 data streams and data on a broadband channel. The MPEG2 data is input to a server 12 via terminal 10. Other MPEG2 data, such as MPEG2 data streams stored on a computer hard drive coupled to the server via, e.g., a SCSI interface, can be provided to the server from storage media 14.

Other data, such as computer data in an Internet protocol (IP) format, are provided to server 12 via a standard network 20. The standard network can comprise, for example, a telephone line, a direct digital link (e.g., a serial communications path), Ethernet, Fast Ethernet, fiber distributed data interface (FDDI), asynchronous transfer mode (ATM), or any other communication network path known in the art. The server 12 multiplexes computer data received from the standard network 20 according to a first data protocol such as the Internet protocol (IP) which has been encapsulated in a second data protocol (e.g., MPEG2) with data streams in the second protocol received via terminal 10 or from data storage 14. Appropriate control messages are also multiplexed with the aforementioned data by server 12, which then transmits the multiplex via a broadband channel 16. The broadband channel may comprise, for example, satellite, CATV, multipoint microwave distribution system (MMDS), or local multi-point distribution system.

A client 18, which can comprise a digital television set top box or the like, receives data via the standard network connection 20 and on the broadband channel 16. In a digital television implementation, the video and audio data (e.g., MPEG2) is passed directly to the appropriate decompression hardware and/or software. The encapsulated computer data (e.g., IP data) which was sent using the second data protocol (e.g., MPEG2) is recovered from the second data protocol and is then sent to a first data protocol stack, which can be the same stack used by similarly formatted data received from the standard network path 20. In a preferred embodiment, the first data protocol stack (e.g., for IP protocol data) has a default route set so that all data out of the client 18 is communicated via the standard network connection 20.

Figure 2:
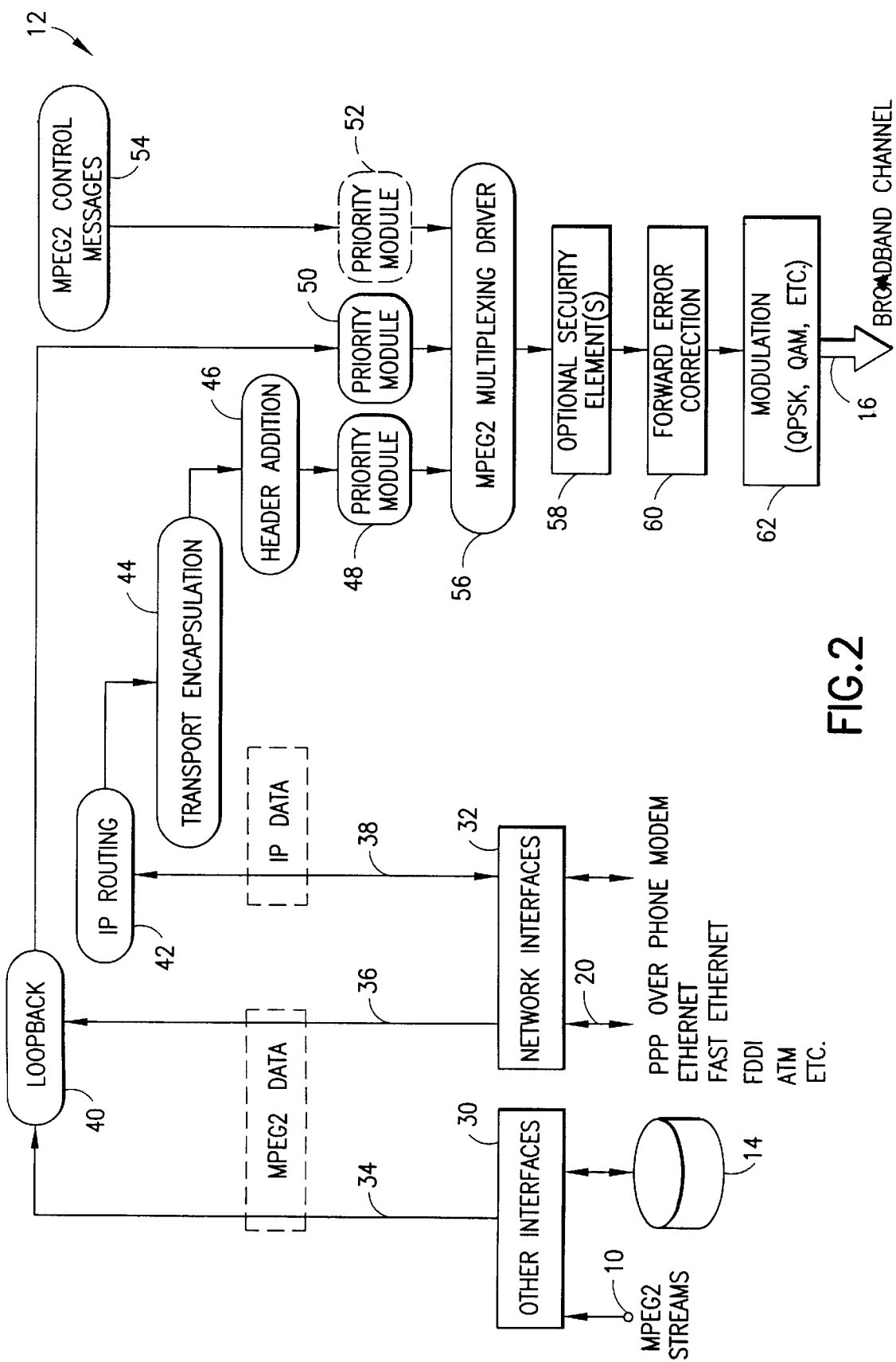
FIG. 2 is a block diagram illustrating an implementation of a server in accordance with the present invention.
Figure 3:
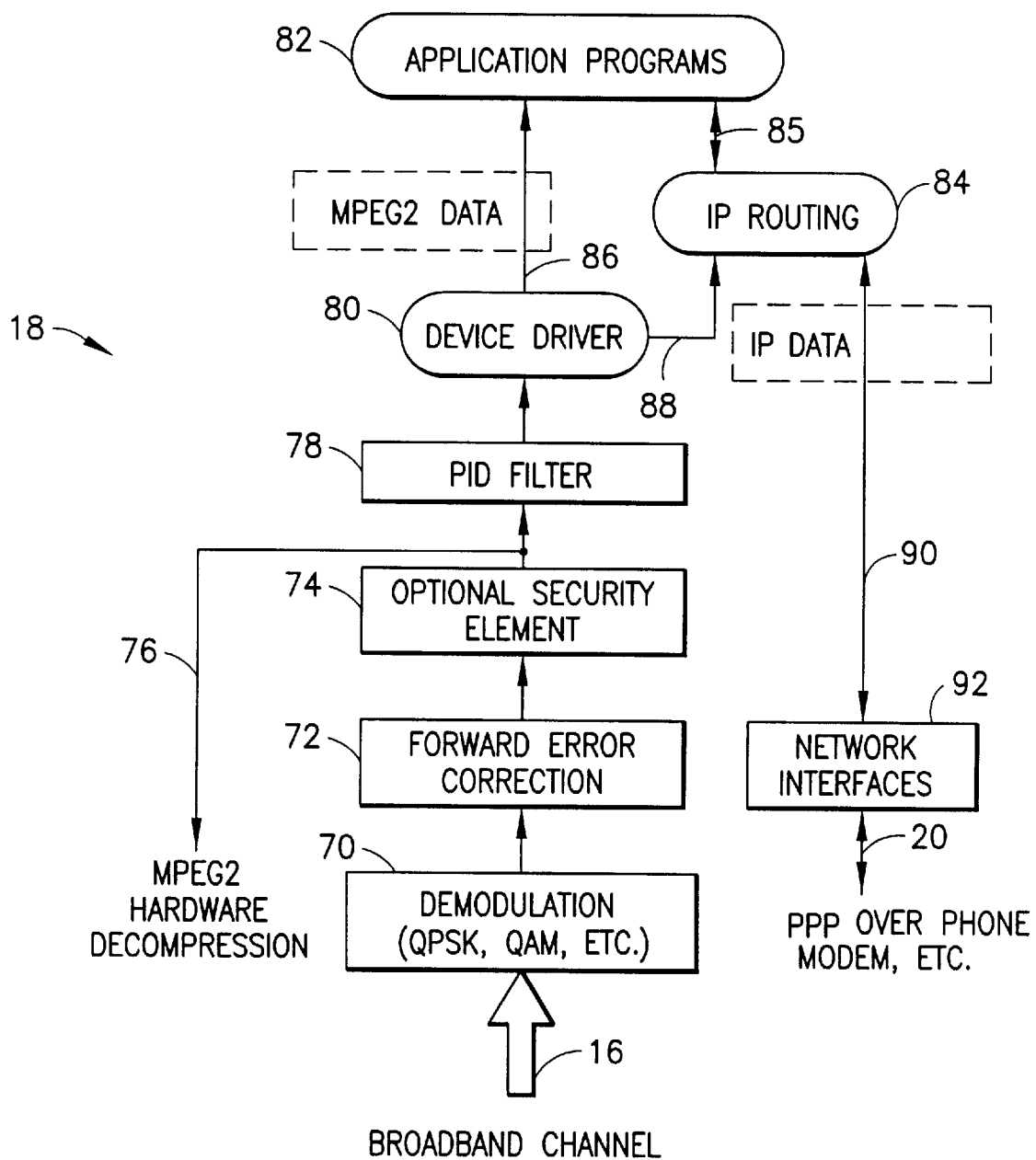
FIG. 3 is a block diagram illustrating an implementation of a client in accordance with the present invention.

FIG. 2 is a block diagram illustrating server 12 in greater detail. For purposes of describing the server 12 in FIG. 2 and the client 18 in FIG. 3, an implementation is shown wherein the first data protocol comprises the Internet protocol and the second data protocol comprises MPEG2. It should be appreciated, however, that the implementation illustrated in FIGS. 2 and 3 is an example only, and that the invention has application to other implementations and, more particularly, data carried using different protocols.

As illustrated in FIG. 2, server 12 provides streaming sources of MPEG2 from "network interfaces" 32 and "other interfaces" 30. The MPEG2 streams are passed to a multiplexing driver 56 via a loopback path 40 and priority module 50. The network interface data is received via the standard network 20. The other interface data is received on a real-time basis from terminal 10 or as stored data from storage media 14 which can comprise, for example, a hard drive incorporating a SCSI or other suitable interface. As indicated in the figure, the data from the other interfaces is provided to the loopback path 40 via line 34. Similarly, the network interface data is provided via line 36.

The loopback path 40 provides a stream of MPEG streams to priority module 50, and can optionally adjust the program clock references (PCRs) and remap the program identifiers (PIDs) of the MPEG2 data streams if necessary. The priority module prioritizes the individual MPEG2 data streams using variable priority queuing described in greater detail in connection with FIGS. 4 and 5. The prioritized data streams are then provided to the multiplexing driver 56.

IP data received via network interfaces 32 is communicated via line 38 to an IP routing path 42. The IP data is routed to a transport encapsulation module 44 which encapsulates the IP data into MPEG 2 transport packets. At module 46, standard MPEG2 headers are added to the transport packets, which are then passed to a priority module 48 which provides a similar function to the IP data that priority module 50 provides for the MPEG2 data. The prioritized IP data is then passed to the multiplexing driver 56.

MPEG2 control messages are generated by module 54. If necessary, these messages can be prioritized in an optional priority module 52 before being passed to the multiplexing driver 56.

After receiving the prioritized IP data, MPEG2 data, and the MPEG2 control messages, the multiplexing driver 56 multiplexes the various streams into an MPEG2 multiplex for communication over an appropriate communication channel. Multiplexing driver 56 also adjusts the PCRs as necessary to remove effects such as packet jitter from the new multiplex. Optional security elements 58 can be provided to encrypt or otherwise render the data, or selective parts of the data, secure. Forward error correction is provided in a conventional manner as indicated at block 60. Similarly, conventional modulation is used at box 62 in order to transmit the multiplex over broadband channel 16.

The priority queuing provided by priority modules 48, 50 and optionally 52, can be used to provide reserved bandwidth for broadcast services or to provide different levels of quality for specific IP connections. In other words, certain connections can be provided with priority in the output multiplex. The effective data rate would be higher for packets traveling via connections having priority. Priority can be based, for example, on the source address for the IP data, the destination IP address, the data type and/or the connection type. The use of source addressing to establish priority is useful in a multicast service, to enable certain services to have a higher priority than others. Destination IP addresses can be used to establish priority based on a level of service purchased by a customer. For example, customers can be offered a high speed, priority Internet access service which will be faster than the standard service purchased by other customers for a lower fee. The IP address of each customer will be used to indicate the priority level depending on the level of service purchased by the customer.

In some systems, it will be desirable to provide different data types with different priority levels. For example, transmission control protocol (TCP) data, such as Telnet and file transfer protocol (FTP) data used for interactive services may have a relatively low priority, whereas multicast data, which is broadcast to a plurality of receivers, may have a higher priority. User datagram protocol (UDP) data, which is not acknowledged but is repetitively sent to provide a "connectionless" service (i.e., without handshaking) may have the lowest priority.

Additionally, different connection types, such as file transfer protocol (FTP) and Telnet, may be provided with different priorities. Typically, FTP files would have a higher priority, and Telnet would have a lower priority since Telnet typically consists of low data rate typed data.

The multiplex transmitted from the server of FIG. 2 is received by the client of FIG. 3. Data from the broadband channel 16 is demodulated in a conventional demodulator 70, forward error corrected in forward error correction circuit 72 and if necessary, decrypted by optional security element 74. The resultant MPEG2 video and audio data is output directly to decompression hardware and/or software via line 76. The encapsulated IP data is detected by a PID filter 78 and passed on to a device driver 80. The PID filter decreases the client processor load by only accepting packets which the processor has an interest in.

Device driver 80 unpacketizes the data and removes the transport layer. The data is then available to be sent directly to application programs 82 or, in the case of IP data, through a protocol stack/router 84 via line 88. IP data destined for application programs 82 is communicated via bidirectional line 85. Data from an application destined for outside the client is sent via IP routing module 84 and line 90 via a standard network interface 92 on network connection 20.

Figure 4:
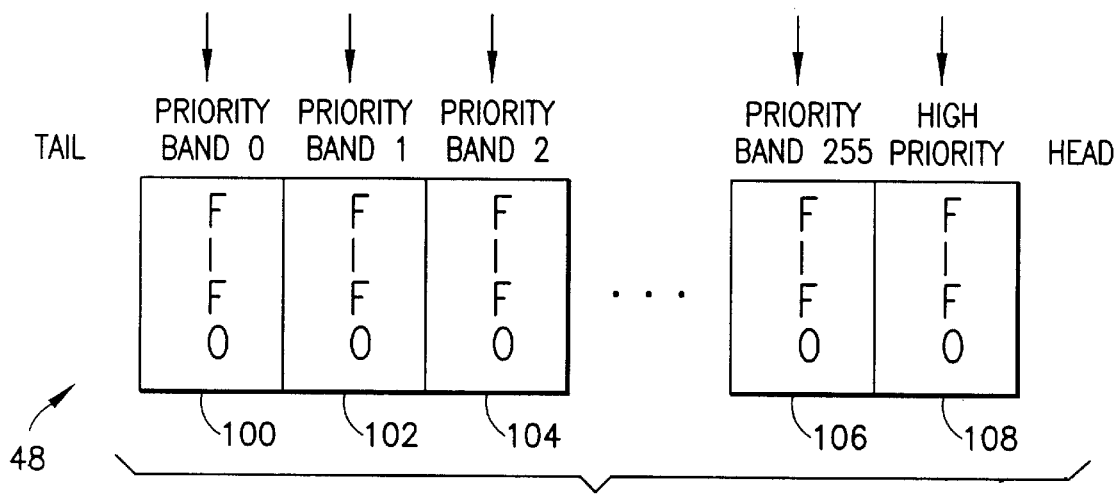
FIG. 4 is a diagram illustrating the prioritization queue in accordance with the present invention.
Figure 5:
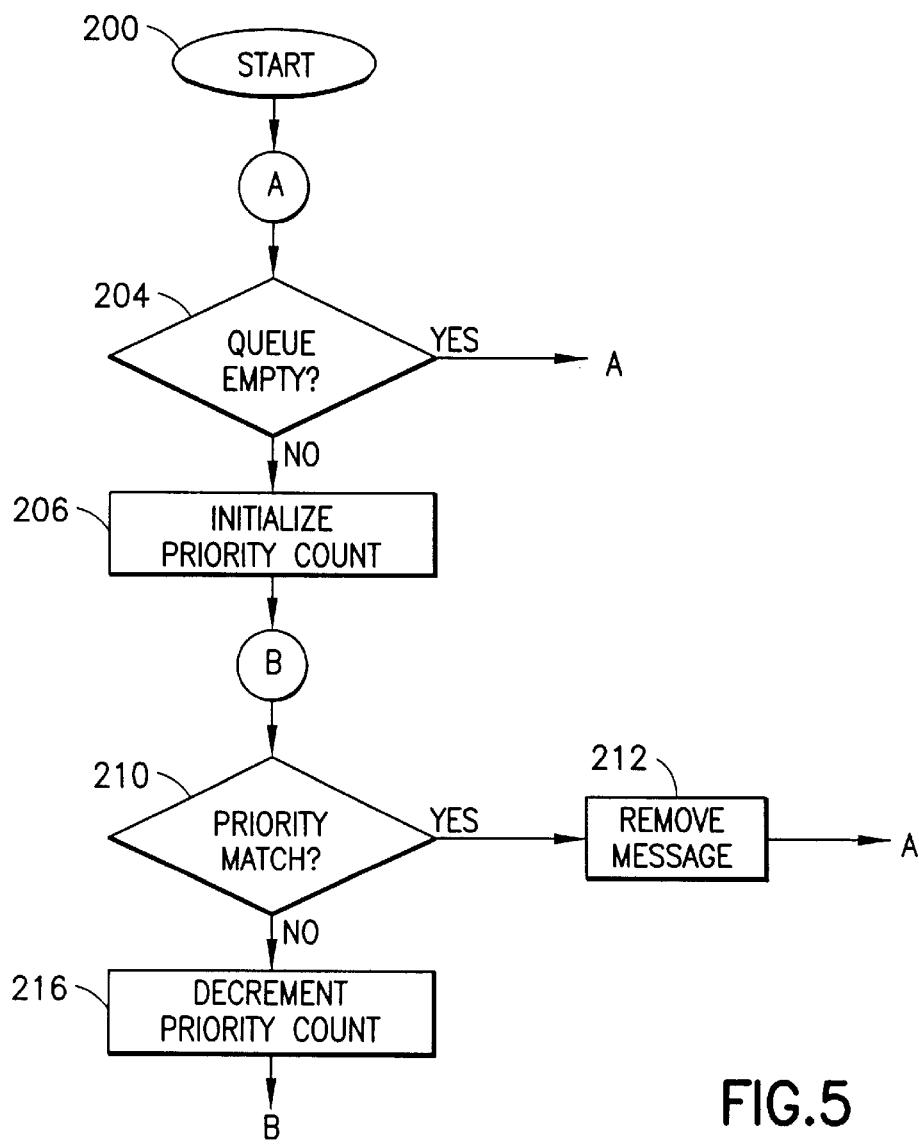
FIG. 5 is flowchart illustrating the prioritization routine.

FIGS. 4 and 5 illustrate the prioritization of IP data, MPEG2 data and/or MPEG2 control messages by priority modules 48, 50 and/or 52. In the case of control messages, high priority may always be used, obviating the need for priority module 52.

In a preferred embodiment, the MPEG2 multiplexing driver 56 (FIG. 2) is written to conform to the data length provider interface (DLPI) Specification Revision 2.0.0 published by Unix International, Inc. DLPI specifies a STREAMS kernel-level implementation of the ISO Data Link Service Definition (International Standards Organization—ISO 8886) and Logical Link Control (ISO 8802/2). STREAMS is a set of tools for the development of system communications services included in System V Release 4 of the Unix operating system.

FIG. 4 illustrates a priority queue used in a priority module, such as priority module 48, to prioritize messages prior to multiplexing them for output on the broadband channel. Each message that enters the MPEG2 multiplexing driver 56 (FIG. 2) has an associated priority assigned to it. The driver processes the queue from head (FIFO 108) to tail (FIFO 100). Messages with the same priority are processed in a first-in first-out manner. Each FIFO represents a different priority level, with the highest priority being assigned to the head FIFO 108 and the lowest priority (priority band 0) associated with the tail FIFO 100. FIFO's 106, 104 and 102 in between correspond to the remaining priority bands which in the example illustrated in FIG. 4, comprise a total of 256 priority bands.

The prioritizing module sets the priority band in the messages based on one or a combination of various conditions extracted from the messages. These conditions can comprise, for example, the destination IP address, the source IP address, the data type and/or the connection type. In each of these cases, the module looks at the incoming packet, extracts the condition variable, looks-up the priority band from a table, inserts the priority into the message and passes the message with the inserted priority along to the multiplexing driver.

FIG. 5 is a flowchart illustrating the prioritization process. The routine starts at box 200, and at box 204 a determination is made as to whether the priority queue is empty. If so, control returns to point A, and the routine continues until there is information in the queue to be prioritized. At this point, control passes to box 206, where a priority count (e.g., the high priority of 256) is initialized. Then, at box 210, a determination is made as to whether the priority inserted into the message matches the current priority count. If so, the message is removed as indicated at box 212, control passes back to point A, and the routine continues.

If a determination is made at box 210 that the priority does not match, the priority count is decremented as indicated at box 216. Control then passes back to point B, and a determination is then made as to whether the priority of the message matches the current priority count. The process will continue until the next highest priority message is removed from the priority queue. At this point, control will pass from box 212 back to point A.

In order to maintain throughput, the multiplexing driver 56 polls the queues provided by the priority modules 48, 50, 52 once every MPEG packet time. In this manner, messages can be derived from each MPEG packet and multiplexed for output on the broadband channel with the appropriate priorities.

It should now be appreciated that the present invention provides methods and apparatus for augmenting a broadband communication system with data in a protocol that is not normally associated with the broadband system. In the particular embodiment illustrated, a broadband digital television system using the MPEG2 transmission standard is augmented to carry Internet data, enabling cable and satellite television operators to provide Internet access to their customers. The Internet access can be provided either via a PC coupled to the receive the recovered IP data, or via a television adapted to display the IP data.

Although the invention has been described in connection with a particular embodiment thereof, it should be appreciated that various modifications and adaptations may be made thereto without departing from the scope of the invention as set forth in the claims.

I claim:

1. A method for communicating computer data provided according to a first data protocol over a digital television broadcast network to a subscriber terminal, said network using a digital video protocol to carry a plurality of digital video data streams, comprising the steps of:

encapsulating said computer data provided according to said first data protocol in at least one transport packet;

providing the at least one transport packet and a corresponding header that conforms to the digital video protocol in at least one of said data streams for distribution in conformance with said digital video protocol;

multiplexing the at least one data stream with remaining ones of said plurality of data streams conforming to said digital video protocol for transmission over said network;

receiving said at least one data stream from said network at said subscriber terminal according to said digital video protocol; and processing the received at least one data stream at said subscriber terminal in accordance with said digital video protocol to recover said computer data provided according to said first data protocol.

2. A method in accordance with claim 1 wherein said first data protocol is an Internet Protocol (IP).

3. A method in accordance with claim 2 wherein said digital video protocol is a Moving Picture Experts Group (MPEG) protocol.

4. A method in accordance with claim 3 wherein said digital video protocol is an MPEG2 protocol.

5. A method in accordance with claim 1 wherein a plurality of different computer data messages are provided according to said first data protocol, said method comprising the further steps of:

prioritizing the different messages according to at least one of source address, destination address, data type and connection type; and multiplexing the different messages with remaining ones of said plurality of digital video data streams for transmission over said network according to priorities determined by said prioritizing step.

6. A method in accordance with claim 5 wherein said prioritizing step comprises the steps of:

extracting priority determining conditions from said messages;

determining a priority for each message in accordance with the extracted conditions; and tagging each message with the priority determined therefor.

7. A method for recovering computer data provided according to an Internet protocol (IP) from a digital video data stream carrying a multiplex of different information signals using a digital video protocol, comprising the steps of:

receiving said multiplex from a digital video distribution channel at a subscriber terminal;

processing said multiplex at said subscriber terminal using said digital video protocol to identify said computer data;

said computer data being encapsulated in at least one transport packet carried by at least one of said information signals, said at least one transport packet having a header that conforms to the digital video protocol;

extracting said computer data from said at least one transport packet; and processing said extracted computer data in accordance with said IP protocol to recover information therefrom.

8. A method in accordance with claim 7 wherein said digital video protocol is a Moving Picture Experts Group (MPEG) protocol.

9. A method in accordance with claim 8 wherein said digital video protocol comprises MPEG2.

10. Apparatus for communicating computer data provided according to a first data protocol over a digital television broadcast network to a subscriber terminal, said network using a digital video protocol to carry a plurality of digital video data streams, comprising:

means for assigning a priority to different computer data messages received in conformance with said first data protocol;

a queue for storing said computer data messages according to their assigned priority;

means for encapsulating the prioritized computer data messages received from said queue in at least one transport packet;

means for providing the at least one transport packet and a corresponding header that conforms to the digital video protocol in at least one of said data streams for distribution in conformance with said digital video protocol; and a multiplexer for multiplexing the at least one data stream with remaining ones of said plurality of data streams conforming to said digital video protocol for transmission over said network to said subscriber terminal.

11. Apparatus in accordance with claim 10 wherein said means for prioritizing are responsive to at least one of a source address, destination address, data type and connection type for each different message in order to prioritize the message.

12. Apparatus in accordance with claim 11 wherein said means for prioritizing extract priority determining conditions from said messages, determine a priority for each message in accordance with the extracted conditions, and tag each message with the priority determined therefor.

13. Apparatus in accordance with claim 10 wherein said first data protocol is an Internet protocol.

14. Apparatus in accordance with claim 13 wherein said digital video protocol is a Moving Picture Experts Group (MPEG) protocol.

15. Apparatus in accordance with claim 14 wherein said MPEG protocol comprises MPEG2.

16. A subscriber terminal apparatus for recovering computer data provided according to an Internet protocol (IP) from a digital video data stream carrying a multiplex of different information signals using a digital video protocol, comprising:

a receiver for receiving said multiplex from a digital video distribution channel;

means for processing said multiplex using said digital video protocol to identify said computer data;

said computer data being encapsulated in at least one transport packet in at least one of said information signals, said at least one transport packet having a header that conforms to the digital video protocol;

means for extracting said computer data from said at least one transport packet; and means for processing said extracted computer data in accordance with said IP protocol to recover information therefrom.

17. Apparatus in accordance with claim 16 wherein said digital video protocol is a Moving Picture Experts Group (MPEG) protocol.

18. Apparatus in accordance with claim 17 wherein said digital video protocol comprises MPEG2.

19. A method in accordance with claim 5, wherein:

said at least one of said data streams carries the encapsulated computer data in successive packets thereof; and the different messages are prioritized in said prioritizing step once for each of said packets.

20. Apparatus in accordance with claim 10, wherein:

said at least one of said data streams carries the encapsulated computer data in successive packets thereof; and said assigning means assigns a priority to the different computer data messages once for each of said packets.

21. A computer data signal in a broadband channel of a digital television broadcast network, said broadband channel including a plurality of digital video data streams that are transmitted from a headend server to a decoder population according to a digital video protocol, comprising:

computer data provided according to a first data protocol; wherein:

said computer data is encapsulated in at least one transport packet having a header that conforms to the digital video protocol;

the at least one transport packet and the header are provided in at least one of said data streams for distribution to said decoder population according to said digital video protocol; and said at least one data stream is multiplexed with remaining ones of said plurality of data streams.

22. The signal of claim 21, wherein:

said first data protocol is an Internet Protocol (IP).

23. The signal of claim 21, wherein:

said digital video protocol is a Moving Picture Experts Groups (MPEG) protocol.

\* \* \* \* \*